(12) United States Patent
Lynch

(10) Patent No.: US 9,432,729 B2
(45) Date of Patent: Aug. 30, 2016

(54) METHOD AND APPARATUS FOR ADAPTIVE TRANSPORT INJECTION FOR PLAYBACK

(75) Inventor: David Johnston Lynch, Westfield, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 2480 days.

(21) Appl. No.: 12/223,764

(22) PCT Filed: Jan. 26, 2007

(86) PCT No.: PCT/US2007/001989
§ 371 (c)(1),
(2), (4) Date: Dec. 18, 2008

(87) PCT Pub. No.: WO2007/092163
PCT Pub. Date: Aug. 16, 2007

(65) Prior Publication Data
US 2009/0274436 A1 Nov. 5, 2009

(51) Int. Cl.
| | | |
|---|---|---|
| *H04N 5/93* | (2006.01) | |
| *H04N 5/783* | (2006.01) | |
| *G06F 5/00* | (2006.01) | |
| *G06F 13/00* | (2006.01) | |
| *H04N 21/44* | (2011.01) | |
| *H04N 5/85* | (2006.01) | |
| *G11B 27/10* | (2006.01) | |
| *G06F 13/38* | (2006.01) | |
| *H04N 21/231* | (2011.01) | |
| *H04N 21/234* | (2011.01) | |
| *H04N 21/24* | (2011.01) | |

(52) U.S. Cl.
CPC ...... *H04N 21/44004* (2013.01); *G06F 13/385* (2013.01); *G11B 27/105* (2013.01); *H04N 5/85* (2013.01); *H04N 21/23106* (2013.01); *H04N 21/23406* (2013.01); *H04N 21/2401* (2013.01)

(58) Field of Classification Search
USPC .................. 386/231, 353, 329, 344; 710/52; 375/E7.013, E7.016, E7.025; 711/171, 711/E12.006
See application file for complete search history.

(56) References Cited

U.S. PATENT DOCUMENTS

| | | | | |
|---|---|---|---|---|
| 6,901,206 B2* | 5/2005 | DaSilva | ........................ | 386/239 |
| 7,630,612 B2* | 12/2009 | Kent, Jr. | ................ | H04N 5/775 |
| | | | | 386/329 |
| 2002/0032844 A1* | 3/2002 | West | ..................... | G06F 9/5016 |
| | | | | 711/171 |
| 2004/0193762 A1* | 9/2004 | Leon | ................. | H04L 29/06027 |
| | | | | 710/52 |

FOREIGN PATENT DOCUMENTS

EP 0852446 7/1998

OTHER PUBLICATIONS

International Search Report, dated May 10, 2007.

* cited by examiner

*Primary Examiner* — Geepy Pe
*Assistant Examiner* — Syed Hasan
(74) *Attorney, Agent, or Firm* — Brian J. Dorini; Reitseng Lin

(57) ABSTRACT

There are provided a method and apparatus for adaptive transport injection for playback. The apparatus includes a playback manager for managing at least one buffer to maintain a fullness of the at least one buffer for a data playback by adapting a data injection size, relating an amount of data injected at a given time into the at least one buffer, to smallest available space in the at least one buffer.

18 Claims, 3 Drawing Sheets

METHOD AND APPARATUS FOR ADAPTIVE TRANSPORT INJECTION FOR PLAYBACK

CROSS-REFERENCE TO RELATED APPLICATIONS

This application claims the benefit, under 35 U.S.C. §365 of International Application PCT/US2007/001989, filed Jan. 26, 2007, which was published in accordance with PCT Article 21(2) on Aug. 16, 2007 in English and which claims the benefit of U.S. provisional patent application No. 60/771,376, filed Feb. 8, 2006.

TECHNICAL FIELD

The present principles relate generally to data playback and, more particularly, to a method and apparatus for adaptive transport injection for transport stream playback.

BACKGROUND

There are potentially several clients for a recorded Moving Picture Experts Group (MPEG) or Digital Broadcast System (DBS) transport stream. At the time of recording, corresponding buffer levels are maintained by the broadcaster. However, when this data is stored to a medium for playback, the buffer levels have to be maintained in order to prevent overflowing a client's buffer and losing any of the data and underflowing the client's buffer and interrupting the playback of the data.

SUMMARY

These and other drawbacks and disadvantages of the prior art are addressed by the present principles, which are directed to a method and apparatus for adaptive transport injection for transport stream playback.

According to an aspect of the present principles, there is provided an apparatus. The apparatus includes a playback manager for managing at least one buffer to maintain a fullness of the at least one buffer for a data playback by adapting a data injection size, relating an amount of data injected at a given time into the at least one buffer, to smallest available space in the at least one buffer.

According to another aspect of the present principles, there is provided a method for playing back media content. The method includes managing at least one buffer to maintain a fullness of the at least one buffer for a data playback by adapting a data injection size, relating an amount of data injected at a given time into the at least one buffer, to smallest available space in the at least one buffer.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
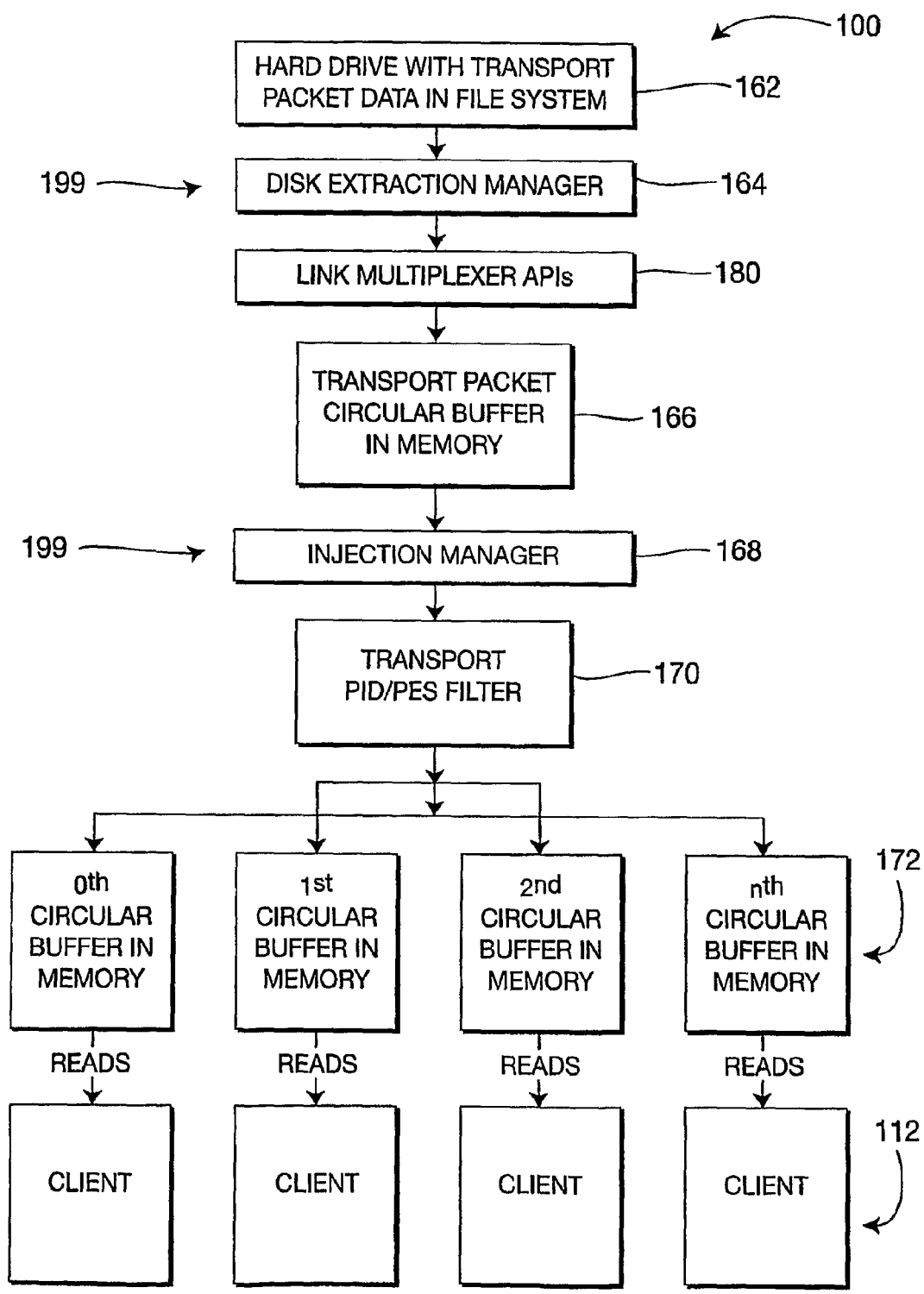
FIG. 1 shows an exemplary client-server environment to which the present principles may be applied, in accordance with an embodiment of the present principles.

The present principles are directed to a method and apparatus for adaptive transport injection for transport stream playback.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

Turning to FIG. 1, an exemplary client/server environment to which the present principles may be applied is indicated generally by the reference numeral 100. The client-server environment 100 includes a set of clients 112, a hard drive 162, a disk extraction manager 164, link multiplexer Application Programming Interfaces (APIs) 180, a transport packet circular buffer 166, an injection manager 168, a transport Packet Identifier/Packetized Elementary Stream (PID/PES) filter 170, and a set of circular buffers 172.

It is to be appreciated that the disk extraction manager 164 and the injection manager 168 may be collectively referred to herein as "playback manager" 199. Moreover, it is to be appreciated that the hard drive 162, the disk extraction manager 164, the link multiplexer Application Programming Interfaces (APIs) 180, the transport packet circular buffer 166, the injection manager 168, and the transport PID/PES filter 170 can be considered to be part of a server side 188 of the client/server environment 100.

In an exemplary embodiment, the server side 188 writes audio, video, data, and/or so forth (collectively referred to herein as "data") into one or more buffers in the set of buffers 172 and one or more clients in the set of clients 112 reads the data out there from. For example, the data may be read out by a decoder of one or more of the clients.

In an embodiment, the address space represented by the set of buffers 172 is shared between the server side 188 and the set of clients 112, so that one or more clients in the set of clients 112 may act upon the data as such data resides in the set of buffers 172.

Of course, as noted above, embodiments described herein are not mutually exclusive and, thus, may be combined and/or otherwise modified and implemented in accordance with the teachings of the present principles, while maintaining the scope of the present principles. That is, given the teachings of the present principles provided herein, one of ordinary skill in this and related arts may contemplate these and other arrangements of the elements of the client/server environment 100 with respect to a server side and a client side as well as the exchanging of data there between, while maintaining the scope of the present principles.

It is to be further appreciated that while circular buffers are described with respect to FIG. 1, given the teachings of the present principles provided herein, one of ordinary skill in this and related arts will contemplate this and other types of memory devices and configurations that may be used in accordance with the present principles, while maintaining the scope of the present principles.

In accordance with the present principles, a method and apparatus are provided for managing video, audio, and/or data buffers for playback from a stored transport stream.

In an embodiment, all client buffers (e.g., buffers 172) are kept full by adapting the size of the packet injection to the smallest available space in the clients' buffers. In this embodiment, data is extracted from the stored medium and injected so as to prevent underflow or overflow of the clients' buffers.

It is to be appreciated that as used herein, the phrase "client buffers" refers to buffers that are part of a client(s) and/or are accessible by a client(s). Thus, in some cases, the client buffers may be part of another entity (e.g., the server), but are nonetheless accessible by a client(s).

In an embodiment, the injection manager maintains full client buffers but restricts injection size to be limited by the smallest free space in the clients' circular buffers. The injection system runs and determines the smallest free space available in the clients' output buffer. An injection is setup to put this number of bytes into the transport. This restriction guarantees that the smallest buffer will not overflow. The size of the injection may be changed to reflect the size of the free space.

Figure 2:
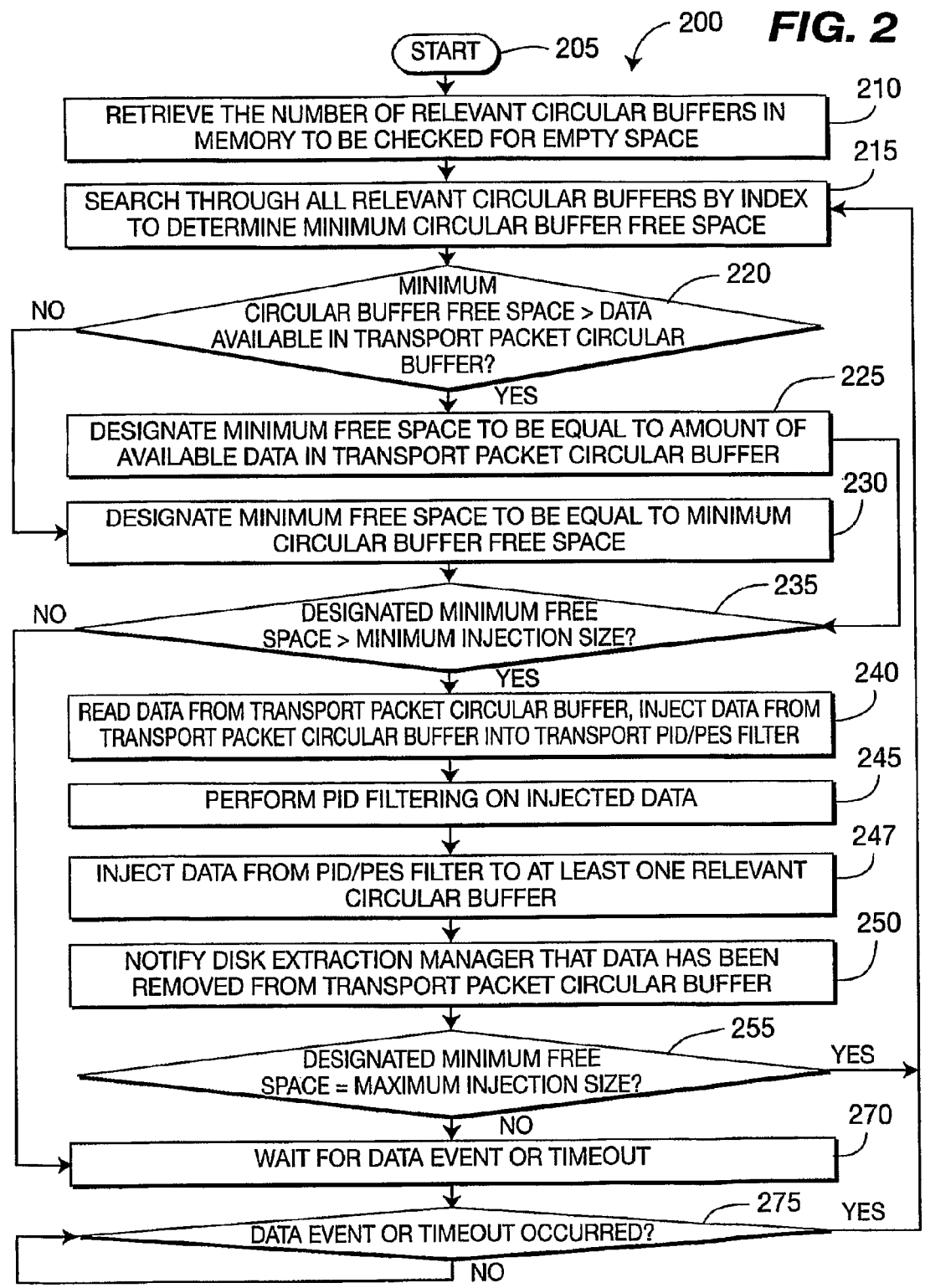
FIG. 2 shows an exemplary method for adaptive transport injection for playback of transport data, in accordance with an embodiment of the present principles.
Figure 3:
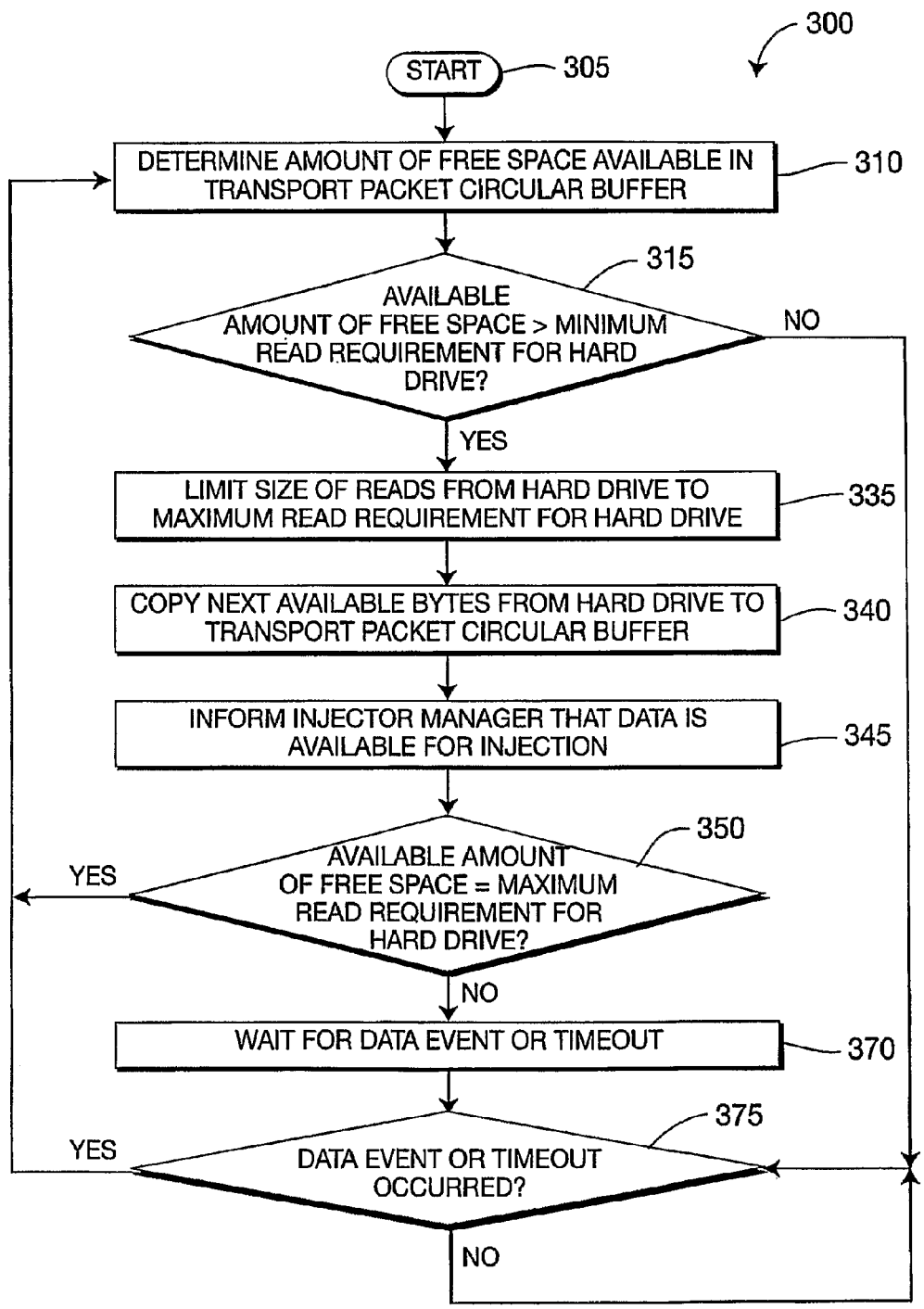
FIG. 3 shows an exemplary method for adaptive disk extraction, in accordance with an embodiment of the present principles.

An embodiment of the present principles will initially be described by the following C language pseudocode, followed by further descriptions with respect to FIGS. 2 and 3. The pseudocode describes functions performed by the injection manager 168 and the disk extraction manager 164 of FIG. 1.

Injection Pseudocode:

```
#define MAX_INJECTION_BYTES 64*1024
#define MIN_INJECTION_BYTES 188
#define INJECTION_POLLING_TIME 1 // set appropriate timeout to wakeup and
check for Circular Buffer Clients reading
main( ) // injection algorithm, injecting maximum bytes into transport based upon the
client with smallest free space available
{
    unsigned int buffer; // index for PES buffers registered to have their empty space
monitored.
    unsigned int min_free_space;
    unsigned int timeout=INJECTION_POLLING_TIME;
    unsigned int num_active_buffers;
    while(1)
    {
        // seed the minimum with the maximum injection bytes
        min_free_space = MAX_INJECTION_BYTES;
        // retrieve the number of relevant circular buffers in memory that we need to
check for empty space
        num_active_buffers = get_active_buffers( );
        // Search through all relevant circular buffers by index for minimum circular buffer
free space
        for( buffer = 0; buffer < num_active_buffers; buffer++ )
        {
            // find the minimum free space of all registered buffers
            if( (space = free_space( buffer )) < min_free_space ) )
```

```
            {
                min_free_space = space;
            }
        }
        // If the minimum free space is larger than the data available in the transport
packet buffer, then use data available instead
        if( (space = data_available( transport_packet_buffer )) < min_free_space )
            min_free_space = space;
        // found minimum circular buffer free space or data available,
        // if it passes the minimum injection bytes, then read from buffer and inject into
transport
        if( min_free_space > MIN_INJECTION_BYTES )
        {
            // inject the data from the transport circular buffer into the transport hardware
for PID filtering
            write_circular_buffer_bytes_into_transport( min_free_space,
transport_packet_buffer );
            // notify disk extraction that data has been removed from the
transport_packet_buffer
            event_post( data_read_event );
            if( min_free_space == MAX_INJECTION_BYTES )
            {
                // max injection, so loop and see if another injection is needed
                continue;
            }
        }
        // not enough data is available or min free space has not been satisfied
        // wait for a data event or wait for timeout to check client buffers again
        // pend for data available or time out
        event_pend( data_available_event, timeout );
    }
}
```

Extraction Pseudocode:

```
#define MIN_HDD_READ 512 // adjust to reflect read characteristics of the hard
drive
#define MAX_HDD_READ 32*512 // set if needed
#define DISK_POLLING_TIME 1 // set appropriate timeout to wakeup and check
free space
main( ) // disk extraction algorithm, keeping the transport circular buffer in memory
full without overflowing
{
    unsigned int space;
    unsigned int disk_timeout=INJECTION_POLLING_TIME;
    while(1)
    {
        // Check to see how much free space is available int the transport circular buf-
fer
        // ensure it is over the minimum read requirement
        if( (space = free_space( transport_packet_buffer )) > MIN_HDD_READ )
        {
            // limit the size of reads from hard drive if required
            if( space > MAX_HDD_READ )
                space = MAX_HDD_READ;
            // copy next bytes from hard drive into the transport circular buffer
            read_disk_into_circular_buffer( transport_packet_buffer, space );
            // wake up injector thread, notify it that data is available
            event_post( data_available_event );
            // max read, so loop to see if another read is needed
            if( space == MAX_HDD_READ )
                continue;
        }
        // free space is not available or minimum read has not been satisfied so wait for
injection or timeout
        event_pend( data_read_event, disk_timeout );
    }
}
```

It is to be appreciated that the term "bytes" in the pseudo code may be replaced with "size", as the present principles are not dependent upon the use of bytes of data and, thus, other measures of data (e.g., bits, etc.) may also be employed while maintaining the scope of the present principles.

Turning to FIG. 2, an exemplary method for adaptive transport injection for playback of transport data is indicated generally by the reference numeral 200.

The method includes a start block 205 that passes control to a function block 210. The function block 210 retrieves the number of relevant circular buffers in memory to be checked for empty space, and passes control to a function block 215.

The function block 215 searches through all the relevant circular buffers by index to determine the minimum free space in the relevant circular buffers (hereinafter the "minimum circular buffer free space"), and passes control to a decision block 220. The decision block 220 determines whether or not the minimum circular buffer free space is greater than the data available in the transport packet circular buffer. If so, then control is passed to a function block 225. Otherwise, control is passed to a function block 230.

The function block 225 designates the minimum free space to be equal to the amount of available data in the transport packet circular buffer, and passes control to a function block 235.

The function block 230 designates the minimum free space to be equal to the minimum circular buffer free space, and passes control to the decision block 235.

The decision block 235 determines whether or not the designated minimum free space (amount of available data in the transport packet circular buffer or the minimum circular buffer free space) is greater than a minimum injection size. If so, then control is passed to a function block 240. Otherwise, control is passed to a function block 270.

The function block 240 reads the data from the transport packet circular buffer, injects the data from the transport packet circular buffer into the transport PID/PES filter for PID filtering, and passes control to a function block 245. The function block 245 performs PID filtering of the injected data, and passes control to a function block 247. The function block 247 injects the data from the transport PID/PES filter into at least one of the relevant circular buffers, and passes control to a function block 250. The function block 250 notifies a disk extraction manager that data has been removed from the transport packet circular buffer, and passes control to a decision block 255.

The decision block 255 determines whether or not the designated minimum free space is equal to a maximum injection size. If so, then control is returned to the function block 215. Otherwise, control is passed to the function block 270.

The function block 270 waits for a data event (e.g., data is now available for injection) or timeout, and passes control to a decision block 275. The decision block 275 determines whether or not a data event or a timeout has occurred. If so, then control is returned to the function block 215. Otherwise, control is returned to the decision block 275.

Turning to FIG. 3, an exemplary method for adaptive disk extraction is indicated generally by the reference numeral 300. The method 300 includes a start block 305 that passes control to a function block 310. The function block 310 determines the amount of fee space available in the transport packet circular buffer, and passes control to a decision block 315. The decision block 315 determines whether or not the available amount of free space in the transport packet circular buffer is greater than a minimum read requirement for the hard drive. If so, then control is passed to a function block 335. Otherwise, control is passed to a function block 375.

The function block 335 limits the size of reads from the hard drive to the maximum read requirement for the hard drive, and passes control to a function block 340.

The function block 340 copies the next available bytes from the hard drive to the transport packet circular buffer, and passes control to a function block 345.

The function block 345 informs the injector manager that data is available for injection, and passes control to a decision block 350. The decision block 350 determines whether or not the available amount of free space in the transport packet circular buffer is equal to a maximum read requirement for the hard drive. If so, then control is returned to the function block 310. Otherwise; control is passed to the function block 370.

The function block 370 waits for a data read event (e.g., data is now available for extraction) or timeout, and passes control to the decision block 375. The decision block 375 determines whether or not a data read event or a timeout has occurred. If so, then control is returned to the function block 310. Otherwise, control is returned to the decision block 375.

A description will now be given of some of the many attendant advantages/features of the present invention, some of which have been mentioned above. For example, one advantage/feature is an apparatus that includes a playback manager for managing at least one buffer to maintain a fullness of the at least one buffer for a data playback by adapting a data injection size, relating an amount of data injected at a given time into the at least one buffer, to smallest available space in the at least one buffer. Another advantage/feature is the apparatus having the playback manager as described above, wherein the at least one buffer includes a plurality of buffers, and the playback manager determines the smallest available space based on all of the plurality of buffers. Yet another advantage/feature is the apparatus having the playback manager as described above, wherein the playback manager determines the smallest available space based on an index of the at least one buffer.

Moreover, another advantage/feature is the apparatus having the playback manager as described above, wherein the playback manager extracts the data from a remote storage device into a transport packet buffer, and injects the data from the transport packet buffer into the at least one buffer. Further, another advantage/feature is the apparatus having the playback manager as described above, wherein the playback manager limits a size of reads from the remote storage device to prevent an overflow condition of the transport packet buffer, when an amount of free space available in the transport packet buffer is greater than a minimum read requirement for the remote storage device. Also, another advantage/feature is the apparatus having the playback manager as described above, wherein the playback manager injects, into the transport packet buffer, an available amount of data greater than the smallest available space in the at least one buffer, when the available amount of data is less than the smallest available space in the at least one buffer.

Additionally, another advantage/feature is the apparatus having the playback manager as described above, wherein the playback manager rechecks the at least one buffer to determine the smallest available space, subsequent to a wait period, when any of an insufficient amount of data is available or the smallest available space in the at least one buffer is greater than a minimum injection size. Moreover, another advantage/feature is the apparatus having the playback manager as described above, wherein the wait period ends upon an occurrence of any of a data available event or a timeout.

Further, another advantage/feature is the apparatus having the playback manager as described above, wherein the playback manager adapts the data injection size based on changes in the smallest available space in the at least one buffer.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
   a playback manager for managing at least one buffer to maintain a fullness of the at least one buffer for a data playback by adapting a data injection size, relating an amount of data injected at a given time into the at least one buffer, to smallest available space in the at least one buffer.

2. The apparatus of claim 1, wherein the at least one buffer comprises a plurality of buffers, and said playback manager determines the smallest available space based on all of the plurality of buffers.

3. The apparatus of claim 1, wherein said playback manager determines the smallest available space based on an index of the at least one buffer.

4. The apparatus of claim 1, wherein said playback manager extracts the data from a remote storage device into a transport packet buffer, and injects the data from the transport packet buffer into the at least one buffer.

5. The apparatus of claim 4, wherein said playback manager limits a size of reads from the remote storage device to prevent an overflow condition of the transport packet buffer, when an amount of free space available in the transport packet buffer is greater than a minimum read requirement for the remote storage device.

6. The apparatus of claim 4, wherein said playback manager injects, into the transport packet buffer, an available amount of data greater than the smallest available space in the at least one buffer, when the available amount of data is less than the smallest available space in the at least one buffer.

7. The apparatus of claim 1, wherein said playback manager rechecks the at least one buffer to determine the smallest available space, subsequent to a wait period, when any of an insufficient amount of data is available or the smallest available space in the at least one buffer is greater than a minimum injection size.

8. The apparatus of claim 7, wherein the wait period ends upon an occurrence of any of a data available event or a timeout.

9. The apparatus of claim 1, wherein said playback manager adapts the data injection size based on changes in the smallest available space in the at least one buffer.

10. A method for playing back media content, comprising:
    managing at least one buffer to maintain a fullness of the at least one buffer for a data playback by adapting a data injection size, relating an amount of data injected at a given time into the at least one buffer, to smallest available space in the at least one buffer.

11. The method of claim 10, wherein the at least one buffer comprises a plurality of buffers, and said managing step determines the smallest available space based on all of the plurality of buffers.

12. The method of claim 10, wherein said managing step determines the smallest available space based on an index of the at least one buffer.

13. The method of claim 10, wherein said managing step extracts the data from a remote storage device into a transport packet buffer, and injects the data from the transport packet buffer into the at least one buffer.

14. The method of claim 13, wherein said managing step limits a size of reads from the remote storage device to prevent an overflow condition of the transport packet buffer, when an amount of free space available in the transport packet buffer is greater than a minimum read requirement for the remote storage device.

15. The method of claim 13, wherein said managing step injects, into the transport packet buffer, an available amount of data greater than the smallest available space in the at least one buffer, when the available amount of data is less than the smallest available space in the at least one buffer.

16. The method of claim 10, wherein said managing step rechecks the at least one buffer to determine the smallest available space, subsequent to a wait period, when any of an insufficient amount of data is available or the smallest available space in the at least one buffer is greater than a minimum injection size.

17. The method of claim 16, wherein the wait period ends upon an occurrence of any of a data available event or a timeout.

18. The method of claim 10, wherein said managing step adapts the data injection size based on changes in the smallest available space in the at least one buffer.

* * * * *